March 6, 1928.  1,661,274

G. R. STEERE ET AL

PIPE CUTTING MACHINE

Filed Feb. 19, 1925   2 Sheets-Sheet 1

Inventors
GEORGE R. STEERE &
ALEXZANDER HURST

Attorney

March 6, 1928.  1,661,274
G. R. STEERE ET AL
PIPE CUTTING MACHINE
Filed Feb. 19, 1925   2 Sheets-Sheet 2
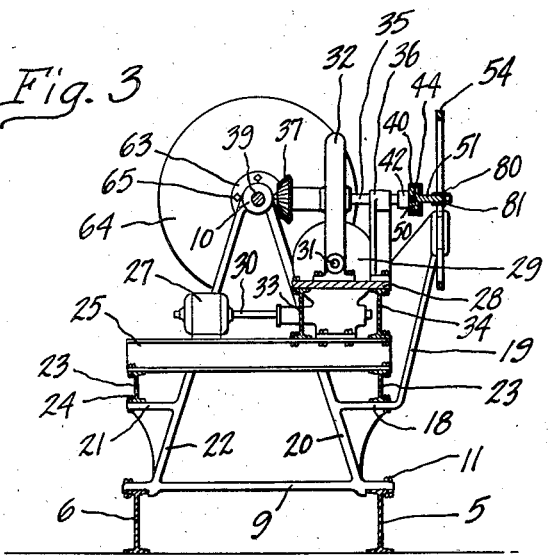
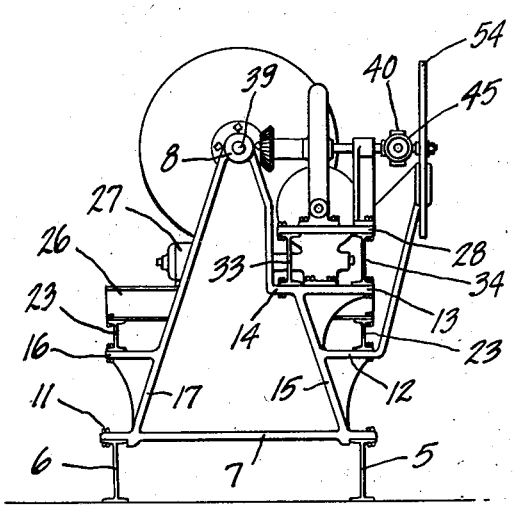
Inventors
GEORGE R. STEERE &
ALEXZANDER HURST
By
Attorney Patented Mar. 6, 1928.

1,661,274

UNITED STATES PATENT OFFICE.

GEORGE R. STEERE AND ALEXZANDER HURST, OF OWOSSO, MICHIGAN, ASSIGNORS, BY MESNE ASSIGNMENTS, TO SEMET-SOLVAY ENGINEERING CORPORATION, OF NEW YORK, N. Y., A CORPORATION OF NEW YORK.

PIPE-CUTTING MACHINE.

Application filed February 19, 1925. Serial No. 10,231.

This invention relates to a cutting machine and more particularly to a machine for cutting articles, as for example pipes of relatively large diameter such as those used in gas plants.

This invention is particularly applicable to the cutting of pipes for the manufacture of elbows or similar fittings. By properly welding or otherwise securing a plurality of pipe sections, the circumferential ends of which lie in a plane at an incline with respect to the longitudinal axis of these pipe sections, the desired fitting may be formed.

One object of this invention is to provide a cutting machine that can accurately, efficiently and economically cut an article on any desired angle, i. e., so that the plane of the end of the cut article is at any desired incline with respect to the axis of the article.

It is a further object of our invention to provide a pipe cutting machine into which a long pipe may be placed and quickly cut on an angle into a number of parts without removing each part when the same is cut.

With the above and other objects in view, our invention consists in the arrangement, combination and construction of the various parts of our improved device, as described in the specification, claimed in our claims and shown in the accompanying drawings, in which:

Fig. 3 is a sectional view taken on line 3—3 of Fig. 1.

Fig. 4 is an end elevation of our improved device.

Figure 1:
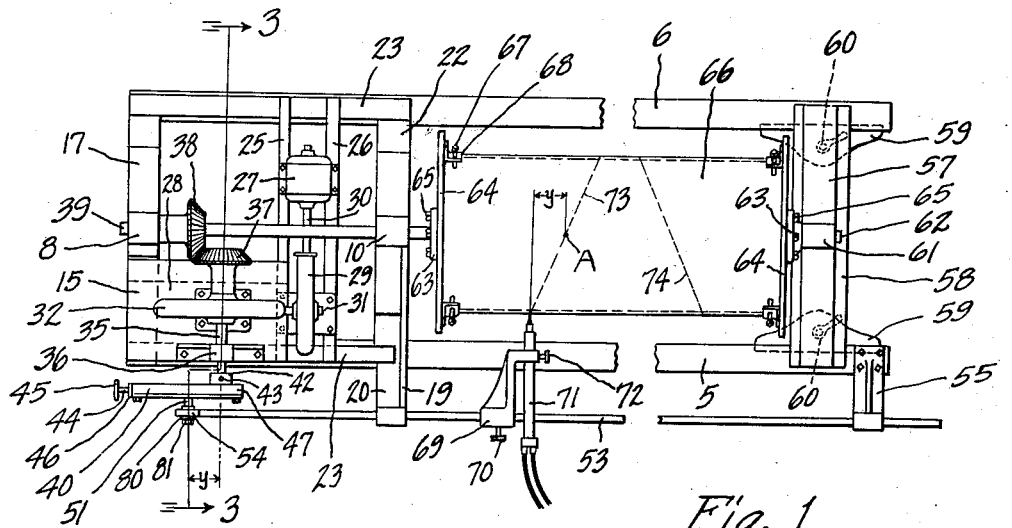
Fig. 1 is a top or plan view of our improved machine.

In the construction of our improved device, we provide as the base the I beams 5 and 6, which have the bearing support 7 with the bearing 8 and the bearing support 9 with the bearing 10, secured thereto by the bolts 11.

The bearing support 7 has the flanged platforms 12, 13 and 14 extending from the side 15 and the flanged platform 16 extending from the side 17. The bearing support 9 has the flanged platform 18 and the arm support 19 extending from the side 20 and the flanged platform 21 extending from the side 22.

Secured to the platforms 12, 18, 16 and 21 by the bolts 24 are the cross, or longitudinal, I beams 23, upon which are fastened the transverse I beams 25 and 26.

Mounted on the I beams 25 and 26 is a motor 27. The driving or armature shaft 30 extends from the motor 27 and has thereon a worm which meshes with a worm gear 29 on shaft 31. Shaft 31 has mounted thereon a worm which meshes with the enclosed worm gear 32 the casing of which is mounted on a platform 28 placed on the longitudinal I beams 33 and 34, which are supported by the I beam 25 and the platform 13. The worm gear 32 is mounted on and drives a shaft 35 rotatably mounted in bearing 36 secured to platform 28.

Secured to one end of the shaft 35 is the bevel gear 37 that meshes in the ratio of one to one with another bevel gear 38 fitted on the shaft 39. The shaft 39 passes through and is supported by the bearings 8 and 10. An elongated member 40 having a scale or ruled surface 41 is secured to the other end of the shaft 35 by means of a collar 42 and a removable pin 43.

A screw 44 having a head 45 is fitted into ends 46 and 47 of the member 40 so that the screw threaded portion 48 is positioned in the slot or space 49 of the member 40. A threaded block 50 having a T shank 51 extending therefrom is threadedly mounted on the screw 44 and is positioned in the slot or space 49 so that the block 50 can be moved by the screw 44. Block 50 is provided with a pin or pointer 52 which is adapted to be positioned on the scale or ruled surface 41 to control the angle of the cut, as will be hereinafter explained.

A rod 53 having an elongated end 54 is positioned in the arm 19 extending from a side 20 and also in the support 55 bolted to the end of the I beam 5. Passing through and movably mounted in the elongated slot 56 in the end 54 of rod 53 is the T shank 51 which has a washer 80 and nut 81 positioned thereon to maintain shank 51 in the slot 54 and permit movement of the shank in the slot.

Figure 2:
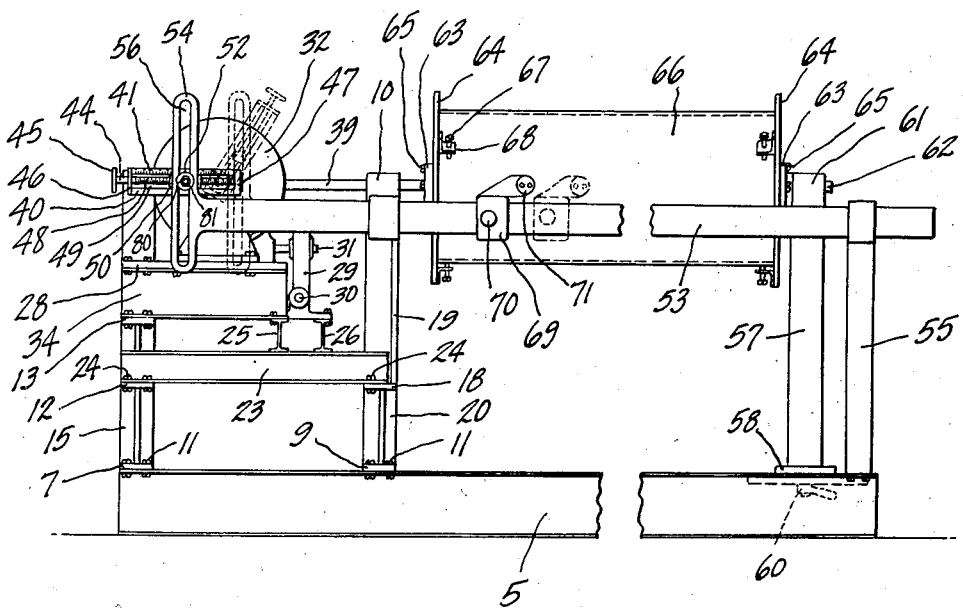
Fig. 2 is a side elevation of our improved machine.

A movable bearing support 57 comprises a base plate 58, clamp plates 59 and clamp bolts 60 that are adapted to firmly secure the base 58 and the plates 59 to the I beams 5 and 6, and has mounted thereon a bearing 61. Shaft 62 is rotatably journaled in bearing 61. The shafts 39 and 62 have flanged ends 63 to which variable sized discs are adapted to be fastened by the bolts 65. In Fig. 2 of the drawing discs 64 are shown fastened to flanged end 63 of shafts 39 and 62.

The article to be cut as for example, pipe 66, is placed between the discs 64 and secured thereon by means of the movable bearing support 57 and bolts 67 fitted into the angle clips 68 fastened to the discs 64.

A movable bracket 69 is secured to the rod 53 by a bolt 70 and the torch 71 is held in place in the bracket 69 by a bolt 72.

In order to cut an article, as for example the pipe 66, on the desired angle, i. e., so that the surface of the cut end lies in a plane at the desired incline with respect to the longitudinal axis of the article, screw 44 is turned to properly position the pointer 52 of block 50 on the scale 41. The position of the pointer is of course determined by the incline of the plane of the desired cut. In the example illustrated in Fig. 1 it is desired to cut the pipe 66 on a plane indicated by the dotted line 73. To accomplish this cut the pointer is set on the scale 41 at a point or reading corresponding to one half the distance that the outermost extremity of the cut end will project beyond the innermost extremity, as for example the distance y Fig. 1. Member 40 is positioned with the end 46 extending upwardly at a right angle to the rod 53 and the torch 71 is locked on the rod 53 so that the flame will strike the pipe 66 at point "A". When the motor 27 is started, the discs 64 and the member 40 simultaneously rotate in the ratio of one to one. The rotation of the member 40 moves the shank 51 up and down in the slot 56, which in turn moves the rod 53, with the torch 71 thereon, back and forth.

Starting with the member 40 in vertical position, as the pipe 66 and member 40 rotate, the bar 53 and torch 71 mounted thereon is reciprocated, performing a complete reciprocation during one complete rotation of the pipe to cut the pipe as indicated by the dotted lines 73. These movements are indicated in part by the dotted lines in Fig. 2.

If it is desired to cut the pipe on an incline as indicated by the dotted line 74 and commence at a point corresponding to A (Fig. 1) the pin 43 is loosened in the collar 42 and member 40 is turned until the end 46 extends downwardly and member 40 is parallel to the elongated end 54 of rod 53 whereupon the cutting operation may be started.

It is evident that the cutting operation need not be started at point "A" but may be started at any circumferential point situated in the desired plane of the cut by properly positioning the bar 53 and member 40 with respect to each other and rotating the shaft 35 to move the torch to describe the desired cut.

At some point in the cutting operation, the flame of the torch 71 is turned off until the pipe has rotated a very short distance. This allows the entire pipe to be cut without taking each piece out separately, it being possible, after the entire length of pipe has been cut, to break these small uncut spaces by striking them.

It will be noted that varying sized articles as for example pipes may be cut with our improved device, and in this connection we desire to point out that the motor 27, or such other prime mover as may be used, is arranged for variable speed operation. This for the reason that a flame from the torch which would cut a pipe of a certain diameter when rotated at a certain speed, would not cut with the same cleanness a pipe of smaller diameter rotated at the same speed as the contact of the torch with the surface of the article would be of shorter duration. Variable speed mechanism for controlling the speed of rotation of the prime mover overcomes this objection.

It is obvious that various changes may be made in the arrangement, combination and construction of the various parts of our improved device without departing from the spirit of our invention, and it is our intention to cover by our claims such changes as may be reasonably included within the scope thereof.

What we claim is:

1. A machine for cutting a pipe including means for mounting and rotating said pipe and automatic means for cutting said rotating pipe on a fixed angle extending in a plane which is less than ninety degrees to the axis of the pipe.

2. A machine for cutting a pipe, including a base, shaft supports extending from said base, shafts mounted in said supports, means on the end of said shafts for holding a pipe and further means for cutting said pipe on a fixed angle extending in a plane which is less than ninety degrees to the axis of the pipe as said pipe is rotated.

3. A machine for cutting a pipe including a base and shaft supports, shafts mounted in said supports and means for rotating one of said shafts, disks on the ends of said shafts between which said pipe is secured, and means for cutting said pipe on an angle as said pipe is rotated.

4. A machine for cutting a pipe including a base, shaft supports extending therefrom, shafts in said supports, a rod, cutting means mounted on said rod and means for rotating one of said shafts and reciprocating said rod simultaneously whereby the circumferential surface of said pipe may be cut on an angle by said cutting means.

5. A device of the class described comprising a base, shaft supports extending from said base, one of said supports being movable, shafts mounted in said supports, a rotatable member and means for simultaneously rotating one of said shafts and said member at the same rate of speed.

6. A device of the class described comprising a rotatable member, an adjustable block in said member, a rod, an elongated slot in one end of said rod, a movable cutting means mounted on said rod and a T shank on said block adapted to reciprocate up and down in said elongated slot on rotation of said member thereby pushing said rod back and forth.

7. A machine for cutting a pipe on an angle including a base, a transverse shaft, means for rotating said transverse shaft, a member and a removable pin securing said member to said transverse shaft, a rod, cutting means mounted on said rod and adjustable means connecting said rod and said member.

8. A machine for cutting a pipe including a base, shaft supports extending therefrom, longitudinal shafts in said supports, a rotatable member, a rod having a slot in one end thereof, cutting means mounted on said rod, adjustable means connecting said rod and said member, means for rotating one of said longitudinal shafts and said member simultaneously whereby the circumferential surface of said pipe may be cut by said cutting means on any fixed angle set by said adjustable means.

9. A machine for cutting a pipe including a base, shaft supports extending from said base, one of said supports being movable, longitudinal shafts fitted in said supports, disks on the end of said shafts, angle clips on said disks, and bolts in said clips whereby said pipe may be held securely between said disks by means of said movable shaft support and said bolts.

10. A machine for cutting pipe, including a base, shaft supports extending therefrom, one of said supports being movable, disks on the end of said shafts, angle clips on said disks and bolts in said angle clips so that said pipe may be held securely in place between said disks by means of said movable shaft support and said bolts, a rod, cutting means on said rod and means for rotating one of said shafts and reciprocating said rod simultaneously whereby the circumferential surface of said pipe may be cut by said cutting means.

11. A machine for cutting pipe including a base and shaft supports extending therefrom, longitudinal shafts mounted in said supports, a rotatable member, means for simultaneously rotating at least one of said longitudinal shafts and said member, an adjustable block fitted into said member, a rod, an elongated slot in one end of said rod, an adjustable torch mounted on said rod and a T shank on said block adapted to reciprocate up and down in said elongated slot on rotation of said member, thereby pushing said rod back and forth, so that the circumferential surface of said pipe may be cut by said torch on any fixed angle determined by the position of said adjustable block.

12. A machine of the class described comprising a pipe holding device and a cutting device, means for rotating one of said devices and reciprocating the other, with the pipe and cutter in contact with each other to cut said pipe on a fixed angle.

13. In a pipe-cutting machine, means for rotating a pipe, a cutter arranged to engage the circumferential surface of said pipe intermediate the ends thereof, means for reciprocating said cutter in timed relation with said rotating means to cut said pipe so that the plane of the cut end of said pipe is at an incline with respect to the longitudinal axis of said pipe.

14. In a pipe-cutting machine, means for rotating a pipe, a cutter, and means for performing a complete reciprocation of said cutter during a complete rotation of said pipe to cut said pipe.

GEO. R. STEERE.
ALEXZANDER HURST.